Patented Sept. 9, 1924.

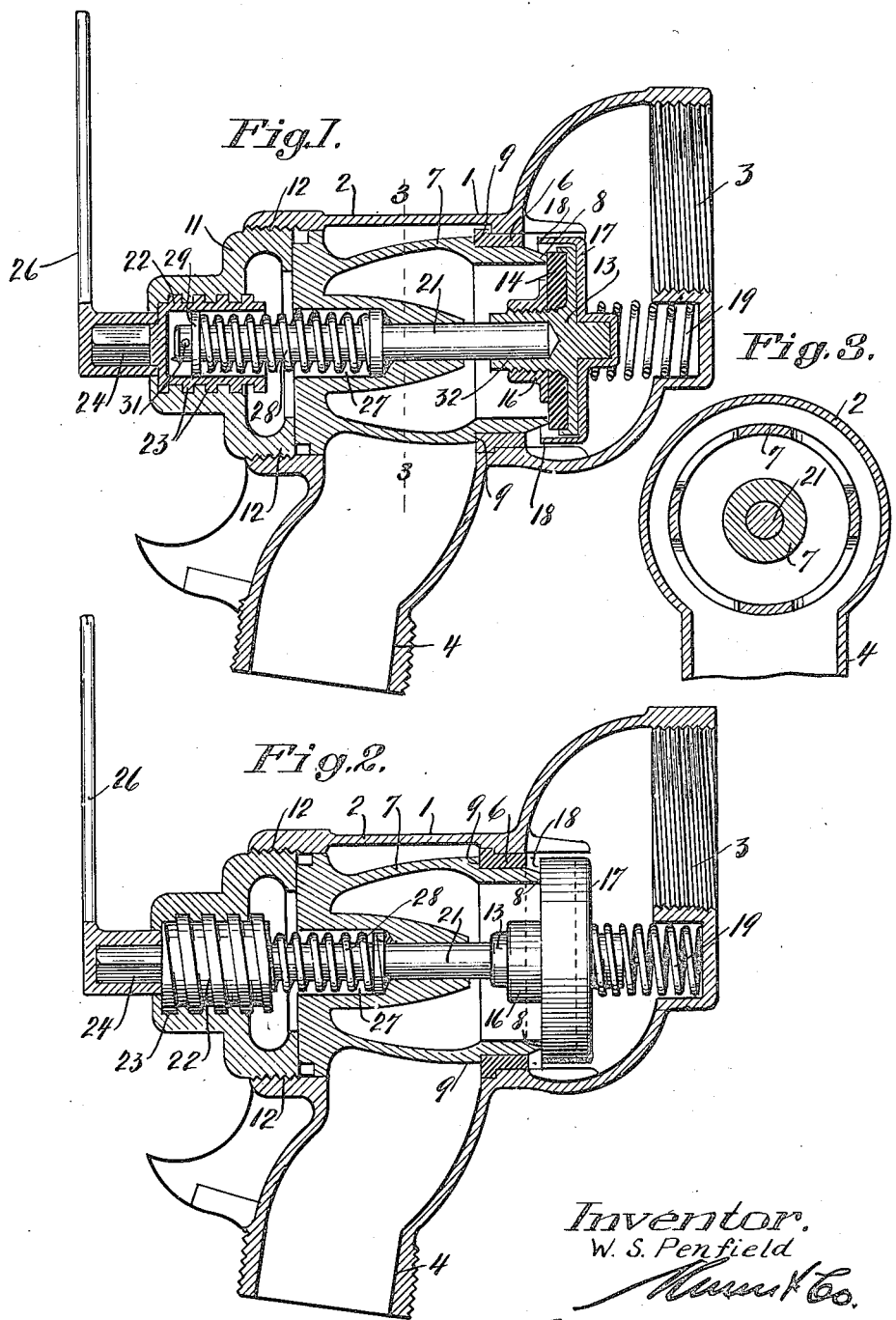

1,508,291

UNITED STATES PATENT OFFICE

WILLIAM S. PENFIELD, OF SAN FRANCISCO, CALIFORNIA, ASSIGNOR OF ONE-HALF TO CHADWICK THOMPSON, OF SAN FRANCISCO COUNTY, CALIFORNIA.

DISPENSING FAUCET.

Application filed January 12, 1924. Serial No. 685,879.

*To all whom it may concern:*

Be it known that I, WILLIAM S. PENFIELD, a citizen of the United States, and a resident of San Francisco, county of San Francisco, State of California, have invented a new and useful Dispensing Faucet, of which the following is a specification.

The present invention relates to improvements in dispensing faucets and its particular object is to provide a faucet principally adapted to be used for the dispensing of oils or gasoline from large portable tanks. The principal feature of my improved faucet is that it will close automatically if the principle working parts of the valve mechanism are removed for the purpose of repairing the same or for other purposes. Further features and advantages of construction of my invention will appear as the specification proceeds.

The preferred form of the invention is illustrated in the accompanying drawing in which Figure 1 shows a longitudinal vertical section through my faucet, Figure 2 a longitudinal vertical section showing certain parts in side view and Figure 3 a transverse view taken along the line 3—3 of Figure 1. While I have shown only the preferred form of the invention it should be understood that various changes or modifications may be made within the scope of the claim hereto attached without departing from the spirit of the invention.

The housing (1) for my faucet comprises a substantially cylindrical body portion (2) and the ports (3) and (4), the former being the intake port and the latter the discharge port, which is preferably arranged transversely to the general direction of the body of the faucet. Internally the housing is provided with a bushing (6) adapted to slidably receive within the same the cage (7), the extreme end of which (8) projects beyond the bushing (6) and forms a valve seat. The cage, which is recessed as shown at (9) to engage the bushing for limitation of longitudinal movement, is forced into an operative position by means of the retaining cap (11) threadedly engaging the housing as shown at (12).

The faucet is normally closed by means of a valve (13) the internal lining (14) of which engages the valve seat (8) and is held in place by a nut (16). The valve (13) is also provided with a valve cap (17), the flange (18) of which is adapted to engage the bushing (6) in case the cage (7) is withdrawn from the housing. A spring (19) engaging the outside of the cap (17) normally forces the valve against its seat.

The valve has a valve stem (21) extending therefrom which passes through the cage (7) into a sleeve (22) which latter threadedly engages the retaining cap (11) as shown by (23). The sleeve terminates, outside of the cap, in a stud (24) of angular cross section adapted to be engaged by the wrench handle (26).

Inside the sleeve and within a registering recess (27) in the cage is provided a spring (28) bearing against a collar (29) held against movement by a pin (31).

The operation of my faucet should be understood from the foregoing description. If the sleeve (22) is turned by means of the handle (26) the valve stem (21) is pushed forward and lifts the valve (13) off the seat (8) so that liquid is allowed to pass through the faucet. Returning the handle to the original position allows the spring (28) to return the valve into engagement with the valve seat (8), the spring (19) cooperating to accomplish this end. If it is desired to take the valve apart it is only necessary to remove the retaining cap (11) to withdraw the valve stem (21) which slidably engages the valve as shown at (32) and to then remove the cage (7) whereupon the spring (19) will automatically force the cap (17) of the valve (13) in contact with the bushing (6) thereby stopping any flow of liquid through the faucet.

I claim:

A dispensing faucet comprising a substantially cylindrical housing having an annular valve seat formed concentric therewith, a cage disposed concentric with the housing extending through and beyond the valve seat to form a second valve seat, a valve head having yielding means bearing thereon for urging the same upon the seats and being formed to engage the first seat when the second seat is withdrawn, a cap threaded into the housing bearing on the cage for holding the same in an operative position, a sleeve threaded into the cap having a handle thereon, a valve stem slidable in said sleeve and extending through the cage into the valve head, and a spring bearing on a seat in the cage and acting on the stem and tending to seat the valve head, the closed end of the sleeve bearing on the valve stem for opening the valve when the sleeve is advanced.

WILLIAM S. PENFIELD.